Oct. 27, 1953    E. C. KRAUS ET AL    2,656,910
MEANS FOR CONVEYING AND ARRANGING CANS IN ROWS
Original Filed May 14, 1947    3 Sheets-Sheet 1
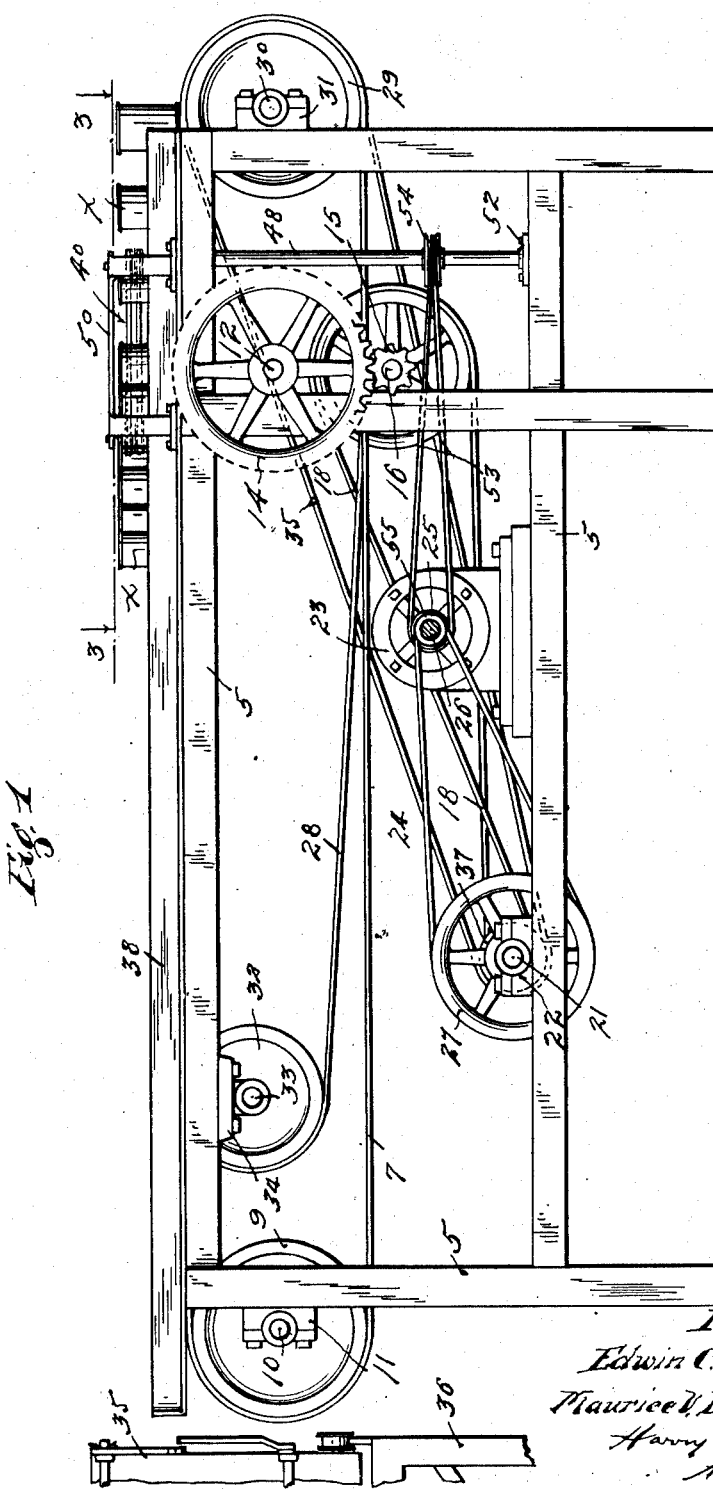
Inventors
Edwin C. Kraus
Maurice V. Douthitt
Harry D. Kilgore
Attorney

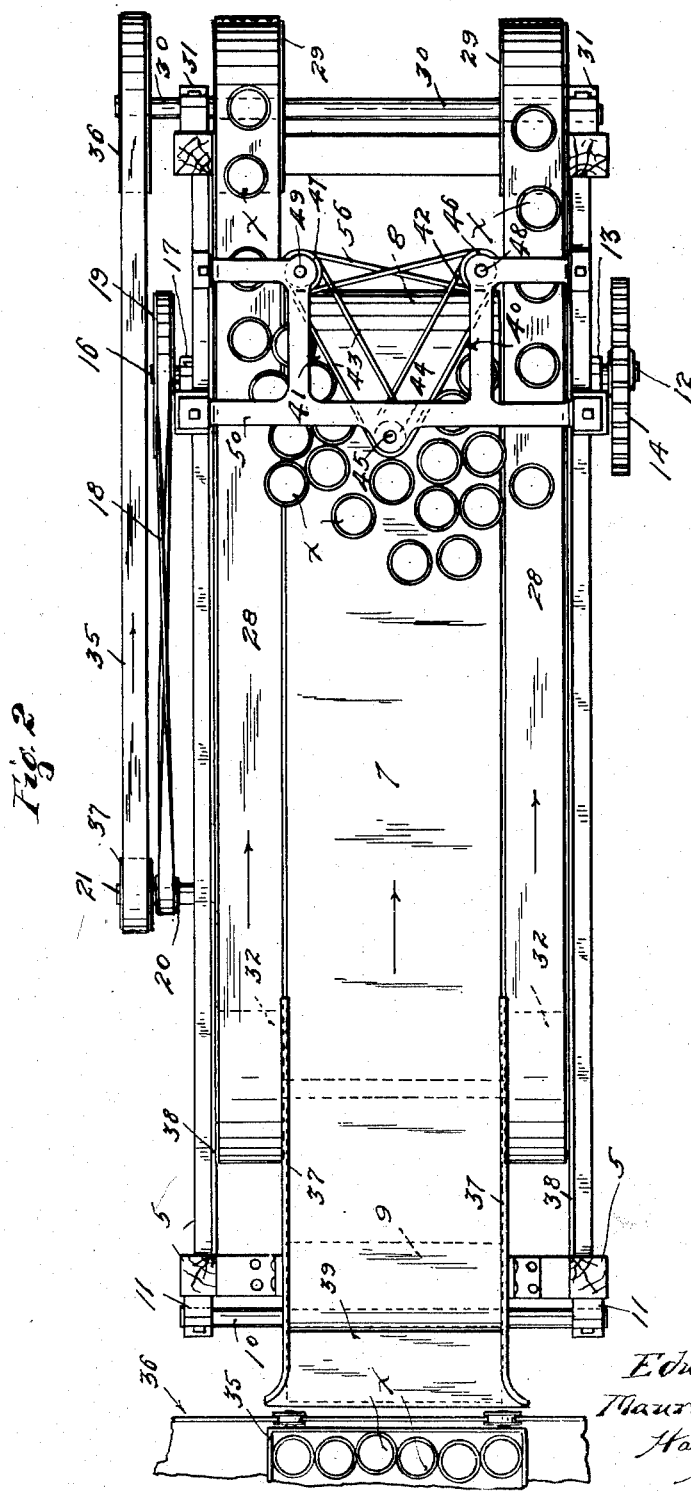

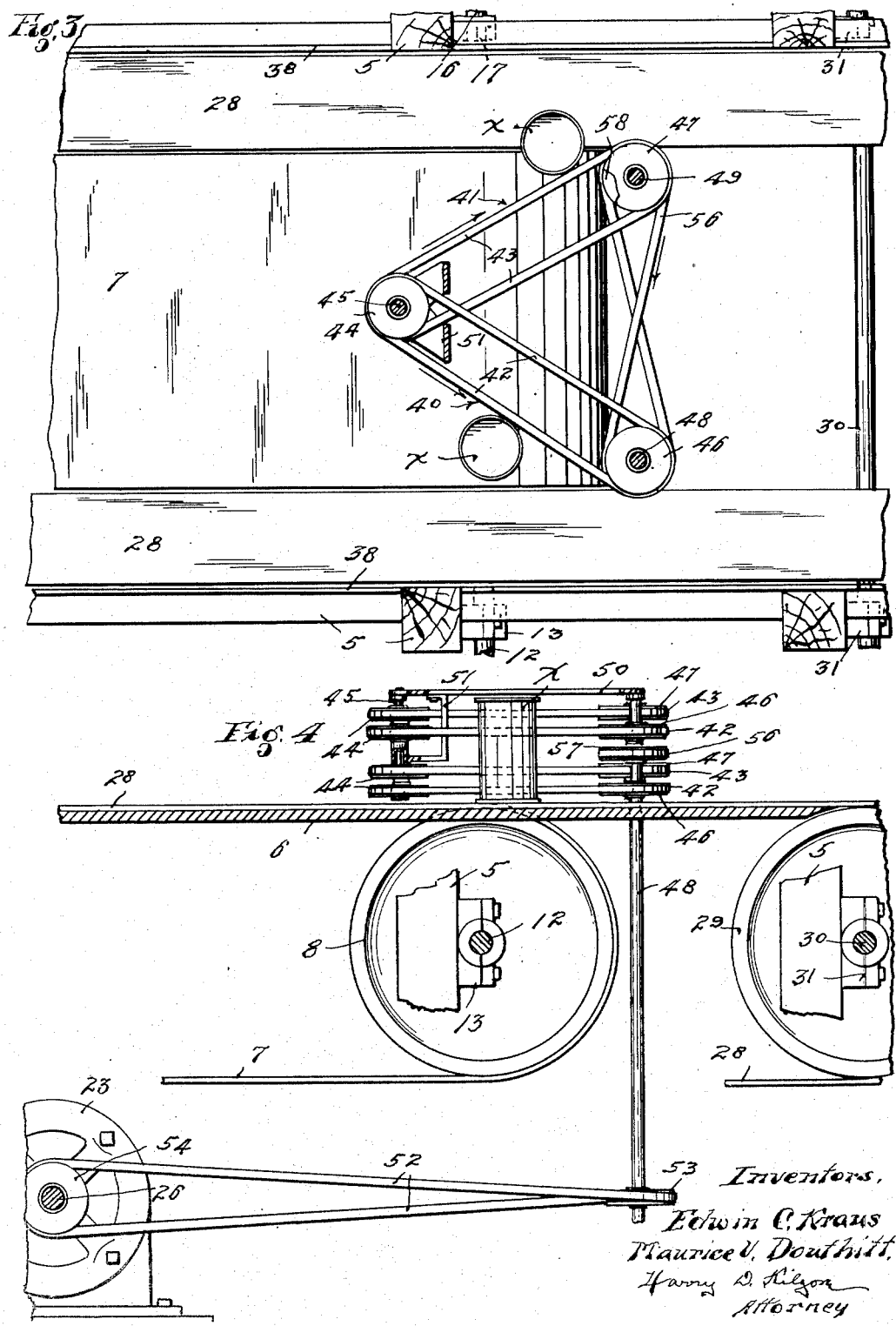

Patented Oct. 27, 1953

2,656,910

UNITED STATES PATENT OFFICE 2,656,910

MEANS FOR CONVEYING AND ARRANGING CANS IN ROWS

Edwin C. Kraus and Maurice V. Douthitt, Ortonville, Minn.

Original application May 14, 1947, Serial No. 748,132. Divided and this application January 12, 1949, Serial No. 70,544

9 Claims. (Cl. 198—30)

1

Our present invention relates to a machine in which cans are delivered thereto in bulk arrangement, and fed therefrom in a row.

This invention is a division of our pending application entitled, "Method and Machine for Handling Tin Cans to be Filled," filed May 14, 1947, under Serial No. 748,132.

The object of this invention is to provide a highly efficient machine in which cans are delivered thereto in bulk arrangement, and fed therefrom in a row.

To the above end the invention consists of the novel device and combination of devices hereinafter described and defined in the claims.

In the accompanying drawings which illustrate the invention, like characters indicate like parts throughout the several views.

Referring to the drawings:

Fig. 1 is a plan view of the improved machine;

Fig. 2 is a right side elevation of the same;

Fig. 3 is a fragmentary view partly in plan and partly in section taken on the line 3—3 of Fig. 1, on an enlarged scale; and Fig. 4 is a view partly in elevation and partly in section of the parts shown in Fig. 3 and further showing an electric motor for driving the deflecting belts.

The numeral 5 indicates a frame supporting a deck 6 on which rests the upper run of a wide endless conveyor belt 7. This belt 7 runs over a driven front pulley 8 and a rear idle pulley 9 on a shaft 10 journaled in bearings 11 on the frame 5. The pulley 8 is carried by a shaft 12 journalled in bearings 13 on the frame 5 and having on one of its end portions a large spur gear 14 that meshes with a spur pinion 15 on a shaft 16 journaled in bearings 17 on the frame 5 directly below the shaft 12.

A crossed belt 18 runs over a large pulley 19 on the opposite end of the shaft 16 from the spur pinion 15 and a small pulley 20 on a countershaft 21 journaled in bearings 22 on the frame 5. This counter-shaft 21 is driven from an electric motor 23 mounted on the frame 5 under the deck 6 by a belt 24 that runs over a small pulley 25 on the armature shaft 26 of the motor 23 and a large pulley 27 on the counter-shaft 21.

A pair of narrow conveyor belts 28 extend parallel to the conveyor belt 7 and are closely positioned, one at each longitudinal edge of said belt 7. These two conveyor belts 28 run over front driven pulleys 29 on a driven shaft 30 journaled in bearings 31 on the front end of the frame 5, and the rear idle pulleys 32 on a shaft 33 journaled in bearings 34 on the frame 5.

2

The conveyor belts 7 and 28 are driven in the same direction, as indicated by arrows thereon in Fig. 2, and their upper runs are all in the same plane as the deck 6. The conveyor belt 7 extends rearwardly of the conveyor belts 28, and the conveyor belts 28 extend forwardly of the conveyor belt 7. The conveyor belts 28 are driven considerably faster than the conveyor belt 7.

Tiers of cans x are successively moved by sliding the same onto the conveyor belt 7 in bulk arrangement from a carriage 35 on a frame 36, fragmentarily shown. This carriage 35 and frame 36, and all parts associated therewith are fully shown, described and broadly claimed in the pending application heretofore identified.

Guard rails 37 secured to the deck 6 extend from the frame 36 forwardly along the longitudinal edge portions of the conveyor belt 7 and overlap the inner longitudinal edges of the conveyor belts 48 at their rear end portions. At the outer longitudinal edges of the conveyor belts 28 are guard rails 38 secured to the frame 5 and extend substantially the full length of said belts. A short deck 39, attached to the guard rails 37, extends from the frame 36 to the upper run of the conveyor belt 7 and is in the same plane as said upper run.

A pair of can deflectors 40 and 41 overlie the front end portions of the conveyor belt 7 for directing the can x on the conveyor belt 7 into rows on the conveyor belts 28. Each deflector 40 and 41 is a pair of endless V-belts 42 and 43 respectively, and the belts of each pair are arranged to run in parallel horizontal planes. All of the V-belts 42 and 43 run over pulleys 44 on a single upright rear shaft 45 above the belt 7 at its transverse center. The belts 42 and 43 also run over front pulleys 46 and 47 respectively, on upright shafts 48 and 49 respectively. These shafts 48 and 49 are forward of the front end of the conveyor belt 7 and located, the former close to the right hand conveyor belt 28, and the latter close to the left hand conveyor belt 28. The shafts 45, 48, and 49, at their upper end portions, are journaled in a horizontally disposed frame 50 that overlies the belt 7 and secured at its ends to the frame 5. The shaft 45 at its intermediate portions is journaled in a bracket 51 on the frame 5 and the shafts 48 and 49, at their lower ends are journaled in bearings 52 on said frame.

The shaft 48 is driven by a belt 53 that runs over a pulley 54 on said shaft and a pulley 55 on the armature shaft 26 of the motor 23. The shaft 49 is driven from the shaft 48 by a crossed belt 56 that runs over pulleys 57 and 58 on said shafts respectively. These pulleys 57 and 58 are located below the pair of V-belts 42, and above the V-belts 42 and 43 as they pass onto the pulleys 46 and 47, slightly overlap the inner longitudinal edge portions of the conveyor belts 28 to insure complete movement of the cans x from the conveyor belt 7 onto the conveyor belts 28.

As heretofore stated, the cans x are moved onto the conveyor belt in bulk form or arrangement and upon reaching the deflectors 40 and 41, that are in forwardly diverging relation from the transverse center of the conveyor belt 7, divide said cans and direct the same into rows onto the conveyor belts 28. Due to the different speeds at which the conveyor belts 7 and 28 are moving, the cans x are spaced apart in a single row on each conveyor belt 28. If the cans x are empty, they are moved by the conveyor belts 28 to a filling mechanism, not shown, on the other hand when said cans are filled, they are moved by the belts 28 to a packaging counter.

While this invention has been described for moving cans, the same is equally well adapted for moving other kinds of containers.

From what has been said, it will be understood that the invention described is capable of modifications as to details of construction and arrangement within the scope of the invention herein described and claimed.

What we claim is:

1. In a machine of the class described, a main frame, an endless main conveyor belt for carrying receptacles thereon in bulk, an endless auxiliary conveyor belt at each side of the main conveyor belt, means for driving the conveyor belts at different speeds, the speed of the auxiliary conveyor belts being materially faster than the speed of the main conveyor belt, a pair of deflectors for directing the receptacles onto the auxiliary conveyor belts in single rows, said deflectors including a bearing frame overlying the main frame, an upright shaft at the transverse center of the main conveyor belt journaled on the bearing frame, a pair of laterally spaced upright shafts journaled in bearings on the main frame forwardly of the main conveyor belt, two pairs of pulleys on the first noted shaft, a pair of pulleys on each of the last noted shafts, a pair of upper and lower belts arranged to run over the pulleys on each of the last noted shafts, and one of the pairs of pulleys on the first noted shafts, and means for driving the last noted shafts including driving connections between said shafts.

2. In a machine of the class described, a main endless conveyor belt for carrying receptacles thereon in bulk, an auxiliary endless conveyor belt on each side of the main belt, parallel thereto, with only working clearance between the adjacent longitudinal edges of their upper runs which are in the same plane, means for driving the belts in the same direction, the speed of the auxiliary belts being materially faster than that of the main belt, a pair of deflecting belts overlying the main belt for directing the receptacles thereon onto the auxiliary belts, said deflecting belts being in forwardly diverging relation, a pair of rear idle pulleys mounted to independently turn about a common vertical axis at the transverse center of the main belt, a pair of front driven pulleys mounted to turn about axes parallel to the axis of the idle pulleys, one at each of the longitudinal edge portions of the main belt, each deflecting belt arranged to run over one of the idle pulleys and one of the driven pulleys, and means for turning the driven pulleys to drive the runs of the deflecting belts facing the auxiliary belts in the same general direction as the main belt.

3. In a machine of the class described, a main endless conveyor belt for carrying receptacles thereon in bulk, an auxiliary endless conveyor belt on each side of the main belt, parallel thereto, with only working clearance between the adjacent longitudinal edges of their upper runs which are in the same plane, means for driving the belts in the same direction, the speed of the auxiliary belt being materially faster than that of the main belt, two pairs of deflecting belts overlying the main belt for directing the receptacles thereon onto the auxiliary belts, said pairs of belts being in forwardly diverging relation, two pairs of rear idle pulleys mounted to independently turn about a common vertical axis at the transverse center of the main belt, two pairs of driven pulleys mounted to turn about axes parallel to the axis of the idle pulleys, one pair of said driven pulleys being at each of the longitudinal edge portions of the main belt, each pair of deflecting belts being arranged to run over one pair of the idle pulleys and one pair of the driven pulleys, the belts of the two pairs being arranged to run in alternate horizontal planes, and means for turning the driven pulleys to drive the runs of the deflecting belts facing the auxiliary belts in the same general direction as the main belt.

4. In a machine of the class described, a main conveyor belt for carrying articles thereon in bulk, means for driving the belt, conveyor means disposed at each side of the belt, a pair of deflecting belts overlying the main belt for directing the articles thereon to the side conveyor means, said deflecting belts being in diverging relation, a pair of pulleys, one for each belt, at the converging ends thereof, said pulleys being substantially coaxially mounted, and a pair of pulleys, one for each belt, at the diverging ends thereof, said last named pulleys being in laterally spaced relation in respect to the longitudinal axis of the main belt, and means for driving the deflecting belts at a predetermined rate of speed in respect to the driven speed of the main conveyor belt.

5. In a machine of the class described, a main endless conveyor belt for carrying receptacles thereon in bulk, a pair of endless auxiliary conveyor belts one at each side of the main belt, parallel thereto, with only a working clearance between the adjacent longitudinal edges of the upper runs of the belts which are in the same plane, means for driving the belts in the same direction, and deflecting belts in V-formation with the leading ends of the belts coaxially mounted and with the trailing delivery ends of the belts extending obliquely in opposite directions transversely over the main belt for directing the receptacles from predetermined sections of the main belt in opposite directions onto one or the other of said auxiliary belts.

6. A machine as defined in claim 4, wherein each of said side conveyor means comprises an endless belt, the conveyor surface of which is substantially coplanar with the conveyor surface of the main conveyor belt.

7. A machine as defined in claim 4, wherein the coaxially mounted pulleys of the deflecting belts are disposed above the main conveyor belt, and are positioned substantially at the transverse center thereof.

8. A machine as defined in claim 5, wherein said auxiliary conveyor belts are operable at a faster lineal speed than the lineal speed of the main conveyor belt.

9. A machine as defined in claim 5, wherein each of said deflecting belts comprises upper and lower sections, operable together, and arranged in vertical superimposition, a section of one belt being disposed in a plane lying between the sections of the other belt.

EDWIN C. KRAUS.
MAURICE V. DOUTHITT.

References Cited in the file of this patent

UNITED STATES PATENTS

| Number | Name | Date |
|---|---|---|
| 1,898,662 | Herold | Feb. 21, 1933 |
| 1,990,549 | Kimball | Feb. 12, 1935 |
| 2,242,531 | Marx | May 20, 1941 |
| 2,389,696 | Stiles | Nov. 27, 1945 |